United States Patent
Jeavons (10) Patent No.: US 8,478,758 B2
(45) Date of Patent: *Jul. 2, 2013

(54) CONTENT MANAGEMENT AND DELIVERY SYSTEM

(75) Inventor: Colin Jeavons, East Sussex (GB)

(73) Assignee: Vertical Search Works, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,566

(22) Filed: Jun. 1, 2012

(65) Prior Publication Data

US 2012/0240021 A1    Sep. 20, 2012

Related U.S. Application Data (60) Division of application No. 12/589,068, filed on Oct. 16, 2009, now Pat. No. 8,195,666, which is a continuation of application No. 11/789,474, filed on Apr. 25, 2007, now Pat. No. 7,606,810.

(60) Provisional application No. 60/795,527, filed on Apr. 27, 2006.

(51) Int. Cl.
*G06F 17/30* (2006.01)

(52) U.S. Cl.
USPC .......... 707/738; 707/822; 715/205; 715/760; 715/781

(58) Field of Classification Search
USPC .......... 707/738, 822; 709/219, 217; 715/760, 715/781, 205; 717/168
See application file for complete search history.

(56) References Cited

U.S. PATENT DOCUMENTS

| | | | |
|---|---|---|---|
| 6,847,969 B1 | 1/2005 | Mathai et al. | |
| 7,120,925 B2 * | 10/2006 | D'Souza et al. | 725/100 |
| 7,313,622 B2 | 12/2007 | Lee et al. | |
| 7,475,404 B2 | 1/2009 | Hamel | |
| 7,606,810 B1 * | 10/2009 | Jeavons | 1/1 |
| 7,925,973 B2 | 4/2011 | Allaire et al. | |
| 7,933,893 B2 | 4/2011 | Walker et al. | |
| 8,195,666 B2 * | 6/2012 | Jeavons | 707/738 |
| 8,219,911 B2 * | 7/2012 | Clarke-Martin et al. | 715/716 |
| 2002/0007393 A1 | 1/2002 | Hamel | |
| 2003/0191816 A1 | 10/2003 | Landress et al. | |
| 2005/0188402 A1 | 8/2005 | de Andrade et al. | |
| 2006/0117348 A1 * | 6/2006 | D'Souza et al. | 725/40 |
| 2007/0033531 A1 | 2/2007 | Marsh | |
| 2007/0038567 A1 | 2/2007 | Allaire et al. | |
| 2007/0038931 A1 | 2/2007 | Allaire et al. | |
| 2007/0260671 A1 | 11/2007 | Harinstein et al. | |
| 2008/0010142 A1 | 1/2008 | O'Brien et al. | |

(Continued)

OTHER PUBLICATIONS

Firstlight, EUpolitix Requirements Specification, Dec. 2002.

*Primary Examiner* — Jean M Corrielus
(74) *Attorney, Agent, or Firm* — Lerner, David, Littenberg, Krumholz & Mentlik, LLP (57) ABSTRACT

A content management and delivery system that works with a publisher website to deliver access to advertising content within Microsites relevant to content accessed by the user on the publisher website. The system includes a computer program product for determining relevance of the advertising content with regard to a selected item of editorial content, and for creating a link to the advertising content in accordance with the relevance thereof. The computer program product ensures that when a user navigates to the advertising content using the link, the user is not caused to exit from a publisher environment.

18 Claims, 10 Drawing Sheets

U.S. PATENT DOCUMENTS

| | | |
|---|---|---|
| 2008/0221983 A1 | 9/2008 | Ausiannik et al. |
| 2009/0197581 A1 | 8/2009 | Gupta et al. |
| 2010/0100545 A1 * | 4/2010 | Jeavons .................. 707/738 |
| 2010/0313116 A1 | 12/2010 | Hyman |
| 2011/0166918 A1 | 7/2011 | Allaire et al. |
| 2011/0191163 A1 | 8/2011 | Allaire et al. |

* cited by examiner

PUBLISHER BRANDING

MICROSITES  SEARCH  ABOUT

Home
Our Goals
Our Businesses
ANALYSTS AND INVESTORS
- Wealth Management
- Retirement Planning
Press Releases
Roth IRA
Contacts

Roth IRA

If you want to avoid federal taxation on your IRA savings - both while they are invested and upon withdrawal - then a Roth IRA may be a valuable option for you. If you meet the eligibility requirements:

- You may elect an annual contribution up to $4,000 of your earned income for 2005 and 2006 in a Roth IRA.
- If you have a spouse, each of you can contribute up to $4,000 for 2005 and 2006 for a total of $8,000 each year. Even if your spouse doesn't work, you may be able to make the maximum annual contribution on his or her behalf.
- In addition, individuals age 50 and older may make an annual catchup contribution of an additional $500 for 2005 and $1,000 for 2006.

Note, however, that your total contributions to an IRA - either a traditional IRA, a Roth IRA, or a combination of the two - cannot exceed the following amount per person per year.

- $4,000 ($4,500 if age 50 or older) for 2005
- $4,000 ($5,000 if age 50 or older) for 2006

With a Roth IRA, all contributions are made on an after-tax basis. So, unlike a traditional IRA, a Roth IRA does not allow for up-front tax deduction.

Indeed, when you take a distribution from a Roth IRA, you may be able to benefit from tax-free earnings if you meet certain requirements. These tax-free earnings could be more valuable to you in the long run than an up-front tax deduction.

I'd like to Find a Financial Advisor to discuss Roth IRAs.

604  607

CONTENT MANAGEMENT AND DELIVERY SYSTEM

CROSS-REFERENCE TO RELATED APPLICATIONS

This application is a divisional of U.S. application Ser. No. 12/589,068 filed Oct. 16, 2009 and scheduled to issue as U.S. Pat. No. 8,195,666 on Jun. 5, 2012, which is a continuation of U.S. application Ser. No. 11/789,474, filed Apr. 25, 2007, issued as U.S. Pat. No. 7,606,810 on Oct. 20, 2009, which claims the benefit of U.S. Provisional Application No. 60/795,527, filed Apr. 27, 2006, the disclosures of which are hereby incorporated herein by reference.

FIELD OF THE INVENTION

This invention relates to online advertising, and more particularly to the delivery of advertising content which is relevant to editorial content displayed on a website

BACKGROUND OF THE INVENTION

Online advertising, where advertising content is displayed to a user alongside published editorial content, is now widely used. Conventional online advertising schemes often do not display content that is relevant to the material the user is reading, and generally add little value to the host website. The appearance of advertising on a website thus can significantly degrade the user experience. This in turn presents challenges to the web publisher and the web user, both of whom are interested in attracting and holding the user's attention.

Banner advertising on a publisher's website is based on a traditional approach to advertising, and is often seen by the user as distracting. The advertising content is very often unrelated to the editorial content the user is reading. Studies have shown that a user encountering a banner actually clicks on the banner to investigate its content less than 1% of the time. Banner advertisements are thus largely ineffective in driving web users to the advertiser's website, and accordingly are not likely to provide sustainable revenue for the publisher hosting the advertising. Furthermore, in those few instances where users become interested in the advertising content, they are forced to exit the publisher's website in order to view that content. Once the users exit, the user experience is outside the control of the publisher.

In order to attract a user's attention more effectively, an advertiser may contract with a third party providing keyword-based matching with editorial content. Similarly, a web publisher may have contextual advertising links served to its website, based on generic keyword matching against the editorial content. While this approach partially addresses the problem of serving links to relevant advertising content, it still requires the user to exit the publisher's website in order to view the advertising content. Furthermore, the web advertiser relationship is generally owned by the contextual advertising service provider, not the web publisher. Thus, the publisher again has little influence on user experience when users are directed away from the publisher website to the advertising via the link. Under such circumstances there is little ability for the publisher to create a visually seamless user experience.

An advertiser may engage a publisher to build a "microsite" for the advertiser within the publisher's website. However, this requires the publisher to commit resources to developing, maintaining and marketing the advertiser's microsite. Because advertising is dynamic and up to the moment, the content of the microsite continually changes. Therefore the publisher must devote substantial resources to simply keeping the advertiser's microsite current. Under this arrangement, the advertiser has little or no control over how the publisher promotes the microsite to drive traffic thereto. In order to secure more prominence on a publisher site, an advertiser may instead sponsor a portion of the publisher's website. This approach provides sustainable revenue for the publisher, but, much like banner advertising, provides no logical relationship between the advertising content and the publisher's editorial content. Therefore, this approach does not meet the advertiser's objective, which is to reach users that are receptive to the advertiser's content and message.

Web users generally enter a publisher's website to seek information about a particular topic. Users will therefore resist advertisements or text links that take them outside of the publisher's website and onto a page where they are required to search for potentially relevant content. On the other hand, users will investigate both advertising content and editorial content, provided that both are relevant to their topic of choice and they are not required to exit the site to find desired content. Thus, while systems for linking editorial content to advertiser content exist, improvement to those systems is desired.

SUMMARY OF THE INVENTION

A delivery system for online advertising is described whereby links to relevant advertising content are delivered alongside related editorial content while the user is viewing the editorial content. The link to the content is capable of being configured to provide the user with a visually seamless experience when linking from the editorial content to the advertising content. The system dynamically loads the links along with the editorial content, allowing the user to access both editorial content and related advertising content quickly and conveniently. This system enables the publisher to influence the user experience when the user accesses advertising content related to the editorial content on the publisher site and to directly work with the advertiser to forge and maintain a sustainable, profitable relationship.

Specifically, the system described herein provides a content management and delivery system that hosts advertising content within microsites. In the system, the microsites are linked to the publisher's website. As used herein, publisher website is any website that is accessible (either free or through subscription) through the internet. An advertiser is any entity that wishes to reach a target audience (i.e. the user) as that audience is viewing content on the publisher website. The system includes an editorial-related advertising (ERA™) system in accordance with the invention. Accordingly, the system includes at least one microsite embedded into a publisher website. ERA™ is a trademark of Firstlight Online Ltd.

The publisher website is defined from the user perspective and includes a publisher environment linked to the ERA environment. The publisher environment displays the editorial content, while the microsite in the ERA environment has the advertising content. "Editorial content" as used herein is information that is delivered with or without a commercial message ("commercial message" herein is marketing an identifiable product or service or viewpoint). "Advertising content" as used herein, is information that is delivered with a commercial message.

The system includes a computer program product for determining relevance of the advertising content with regard to a displayed item of editorial content, and for creating a link to the advertising content in accordance with the relevance thereof. The computer program product is configurable to provide a seamless user experience that does not cause the user to exit from the publisher website as it links to the advertising content in the microsite.

The present invention also contemplates a method for linking advertising content to related editorial content in a publisher website. The method includes constructing a taxonomy map (i.e. a hierarchical arrangement of categories also described as a category tree) for the editorial content and the advertising content. At least one tag, which is constructed according to the taxonomy map is assigned to each item of editorial content and to each item of advertising content. When a user of the publisher website selects an item of editorial content, the system compares the tag of the selected item with the tags for the advertising content. The system then evaluates the comparison against a predetermined threshold requirement for matching tags. Based upon the evaluation, the system provides a link to an item of advertising content adjacent the selected item of editorial content if the comparison meets or exceeds the predetermined threshold.

The foregoing has outlined, rather broadly, the preferred features of the system and method described herein so that those skilled in the art may better understand the detailed description of the invention that follows. Additional features of the system and method will be described hereinafter that form the subject of the claims of the invention. Those skilled in the art should appreciate that they can readily use the disclosed conception and specific embodiment as a basis for designing or modifying other systems and methods for carrying out the same purposes of the invention claimed herein and that such other systems and methods do not depart from the spirit and scope of the claimed invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

FIGS. 6A and 6B illustrate displays to a user of a publisher website and an advertising microsite according to an embodiment of the present invention.

DETAILED DESCRIPTION

Figure 1A:
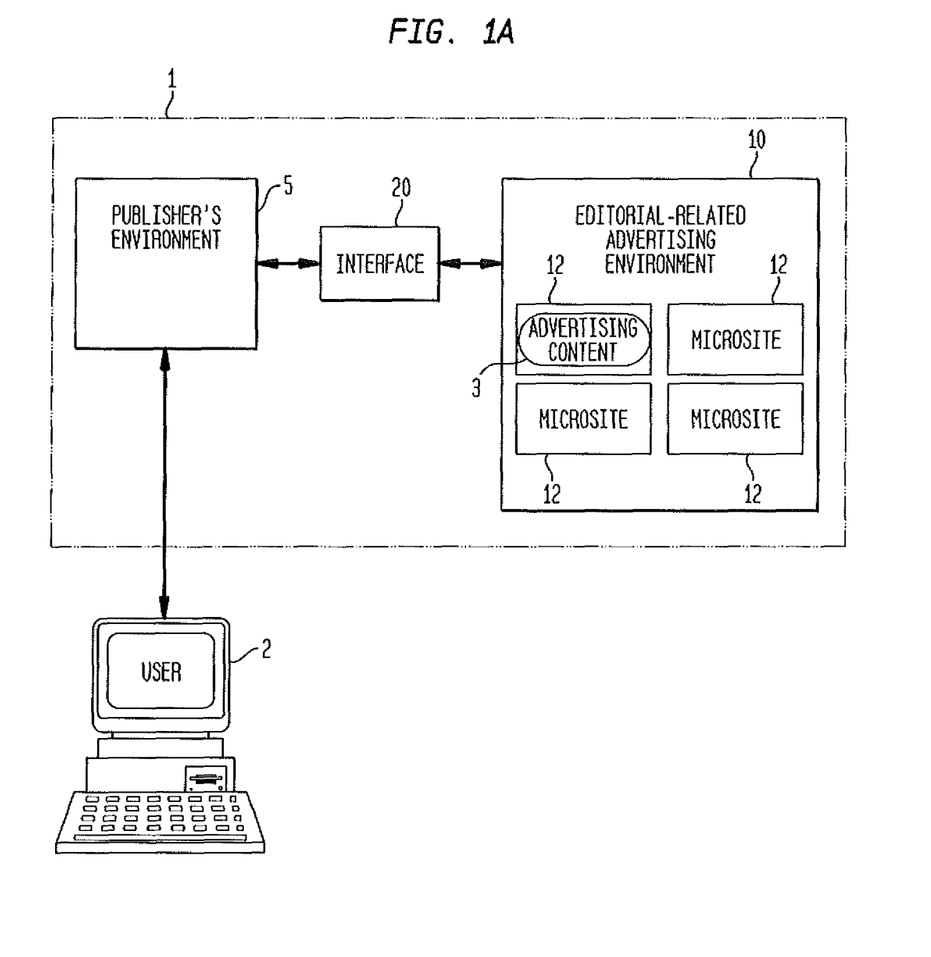
FIG. 1A is a schematic illustration of a publisher website including an editorial-related advertising (ERA) environment therein, in accordance with an embodiment of the invention.

FIG. 1A is a block diagram illustrating a publisher's website 1 from the user 2 perspective. FIG. 1A is not intended to represent that the entire publisher website 1 is on a single server or has a single web address (although such an arrangement is not precluded). FIG. 1A indicates that the user does not exit the publisher website (i.e. the user's link to the publisher's environment 5 is not severed) as the user navigates back and forth between the publisher environment 5 and the ERA environment 10. The user experiences a publisher environment 5 and an editorial-related advertising (ERA) environment 10, in accordance with an embodiment of the invention. FIG. 1A also schematically illustrates the user navigation of the website through the publisher environment 5. The publisher environment 5 (which includes the editorial content offered by the publisher) is accessed by the user 2. The advertising content 3 is published (i.e. viewed) directly within the ERA environment 10. An interface 20 to the ERA environment, is viewed by the user when in the publisher environment 5. The interface is loaded into the publisher environment in a manner that allows the user to view the interface when viewing the editorial content on the publisher website. In one embodiment, the interface 20 contains one or more live links viewable in a frame in the publisher window 5. The frame is actually a small window into the ERA environment 10 that appears in the larger publisher window. Each link is to a microsite 12 in the ERA environment 10. The interface is dynamic in that it only appears adjacent content on the publisher's environment 5 that the system determines is relevant to one or more microsites 12 within the ERA environment 10. When the user 2 clicks on a link in the interface 20, the user is able to view the microsite 12 content in the ERA environment 10 related to that link. The user is able to view the microsite 12 content without exiting the publisher environment (although the publisher window may be either "minimized" or "behind" the microsite window viewed by the user).

Figure 1B:
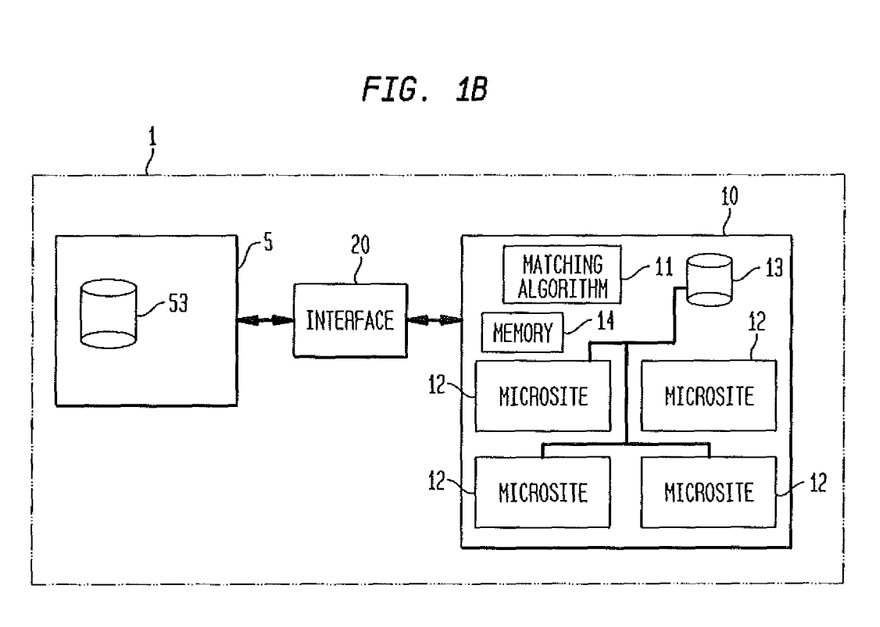
FIG. 1B is another schematic illustration of a publisher website, showing further details of the ERA environment of FIG. 1A.

As shown in FIG. 1B, publisher environment 5 includes database 53 which houses the publisher's editorial content (e.g. news articles). Although illustrated as database 53, any conventional mechanism for storing retrievable data (e.g. computer memory) is contemplated as suited for use in the system. The ERA environment 10 includes a matching algorithm 11 for matching editorial content with relevant advertising content; details of this algorithm are discussed below. The ERA environment also typically includes a plurality of microsites 12 leased by advertisers. The advertisers' advertising content may reside in the respective microsites, or preferably reside on a common database 13 maintained by the ERA system provider. Preferably, database 13 is not directly accessible by the user 2 of the publisher website. In response to a user 2 selecting a link adjacent content published on the publisher website 1, database 13 is accessed to provide the advertising content to the microsite 12 associated with the link. Database 13 is embedded in the ERA environment 10 as shown in FIG. 1B, and the microsites have common access to database 13 for loading and displaying the microsite 12 content.

As previously noted, advertising content is dynamic and up to the minute. As such, advertising content is frequently updated. In one embodiment, the advertisers send updates of the advertising content to the ERA system provider. The ERA system provider edits the updated content for publication on the relevant microsite 12. The ERA system 10 uploads the content into the respective microsites 12. In one embodiment, the system is configured to afford each advertiser the opportunity to review the updated content after that content has been uploaded onto the microsite.

It is advantageous, but not required, that the ERA system provider builds and hosts the microsites 12. This is advantageous because it allows the ERA system provider to configure the microsites 12 to work most efficiently with the publisher environment 5 to dynamically link the advertising content 13 within the microsites 12 to relevant editorial content in the publisher environment 5. The ERA system delivers the dynamic links to the microsite content via the interface 20. Delivery of the links to the user and user's access to the microsite 12 content are provided in a manner that does require the user to exit the publisher environment. In a preferred embodiment, the publisher environment 5 and the microsites 12 in the ERA environment are configured to convey a visually seamless experience to the user 2. However, this is not required as the publisher and advertiser may opt to deliver visually distinct user experiences.

The advertiser's microsite 12 is illustrated as a permanent presence within the publisher website 1 because, at any moment, a user 2 in the publisher environment 5 may access content that is dynamically linked to one or more advertiser microsites in the ERA environment 10. Accordingly, from the advertiser's point of view the microsite has the potential to reach a large audience while presenting a wide range of content, and thus has many advantages compared to conventional web advertising such as a short term banner campaign. As previously noted, it is contemplated that the microsites are built in a number of different ways (i.e. by the owner of the ERA system, by the advertiser or by the publisher). It is advantageous if the microsites are built by the ERA system owner to ensure that the microsites work with the interface 20 and the publisher's environment 5. In one embodiment, in order to deliver a consistent user experience, it is advantageous if the ERA system uses a template system for the creation of the advertiser microsites 12. The presentation of these microsites can be further customized and tailored via the ERA system to deliver the required advertiser branding and design elements, while retaining consistency in the overall layout.

The ERA environment 10 further includes a front end block 14 for maintenance of the microsites and in-place editing of content, upkeep of tag information (discussed in detail below), monitoring and tracking of visits to sites, statistical and reporting functions, and various other tasks. One skilled in the art can readily construct such a front end block. As such the front end block will not be further described herein.

Figure 1C:
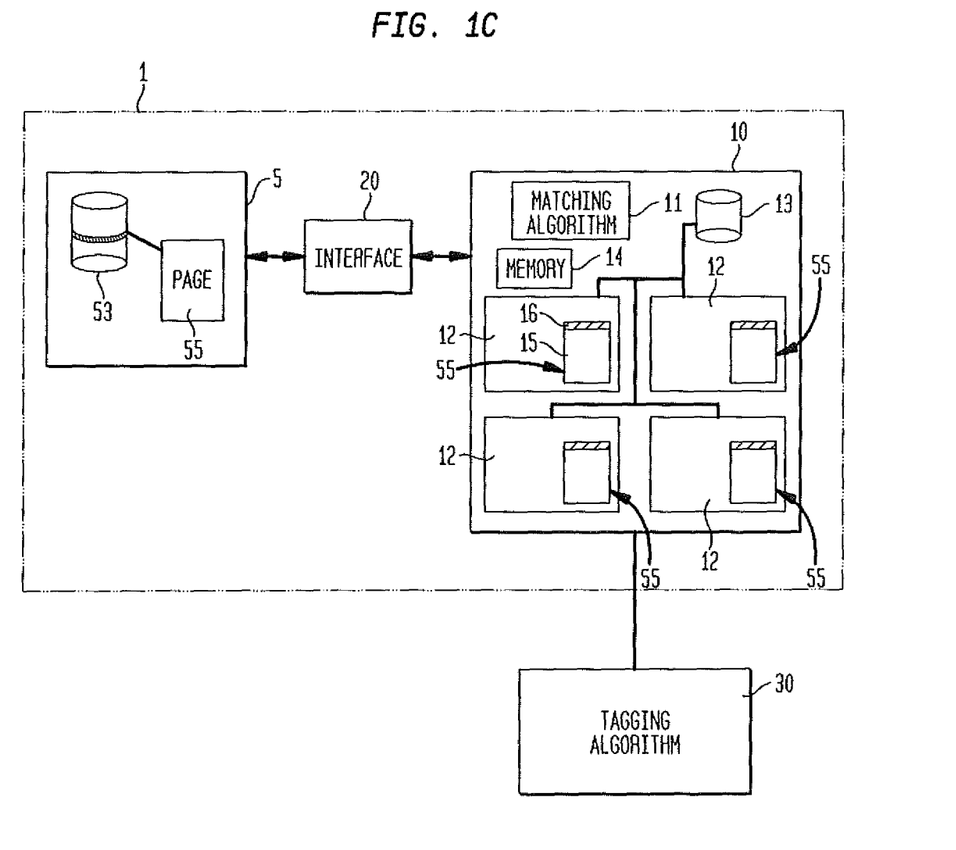
FIG. 1C is another schematic illustration of a publisher website, showing editorial content and advertising content with metatags, in accordance with an embodiment of the invention.

Editorial content is matched with advertising content using tagging metadata associated with the content. Referring to FIG. 1C, each item (or page) 55 of editorial content has a small quantity of metadata 15 associated therewith. The metadata associated with the editorial content 16 is stored in 14. Metadata is associated with each item of editorial content as a result of tagging the item with a classification consisting of one or more categories. Categories have a hierarchical relationship with each other in the context of a taxonomy map or category tree which is described in greater detail below. In one embodiment, the tagging of the editorial content is done manually (e.g. articles are manually identified, reviewed and tagged). In other embodiments, some or all of the tagging is done automatically. For example, the address of new editorial content is identified, and an algorithm is used to assign a tag to the content. In another example of automated tagging 30, a spider or crawler that extracts sufficient information to understand its relevance according to a predetermined taxonomy map is used to crawl the publisher site for untagged content, which is then tagged as described above. The tagging of a library of content is preferably performed prior to the system user selecting such content for downloading into the publisher site, but tagging the editorial content when it is selected for downloading is also contemplated. Note that tagging herein is described from a hypothetical user's perspective. In this regard, the tagging sequence is not described in absolute terms. Specifically, an item of editorial content might be downloaded many times before it is ultimately tagged. The tagging sequence according to a predetermined taxonomy map is described in more detail below.

Figure 2:
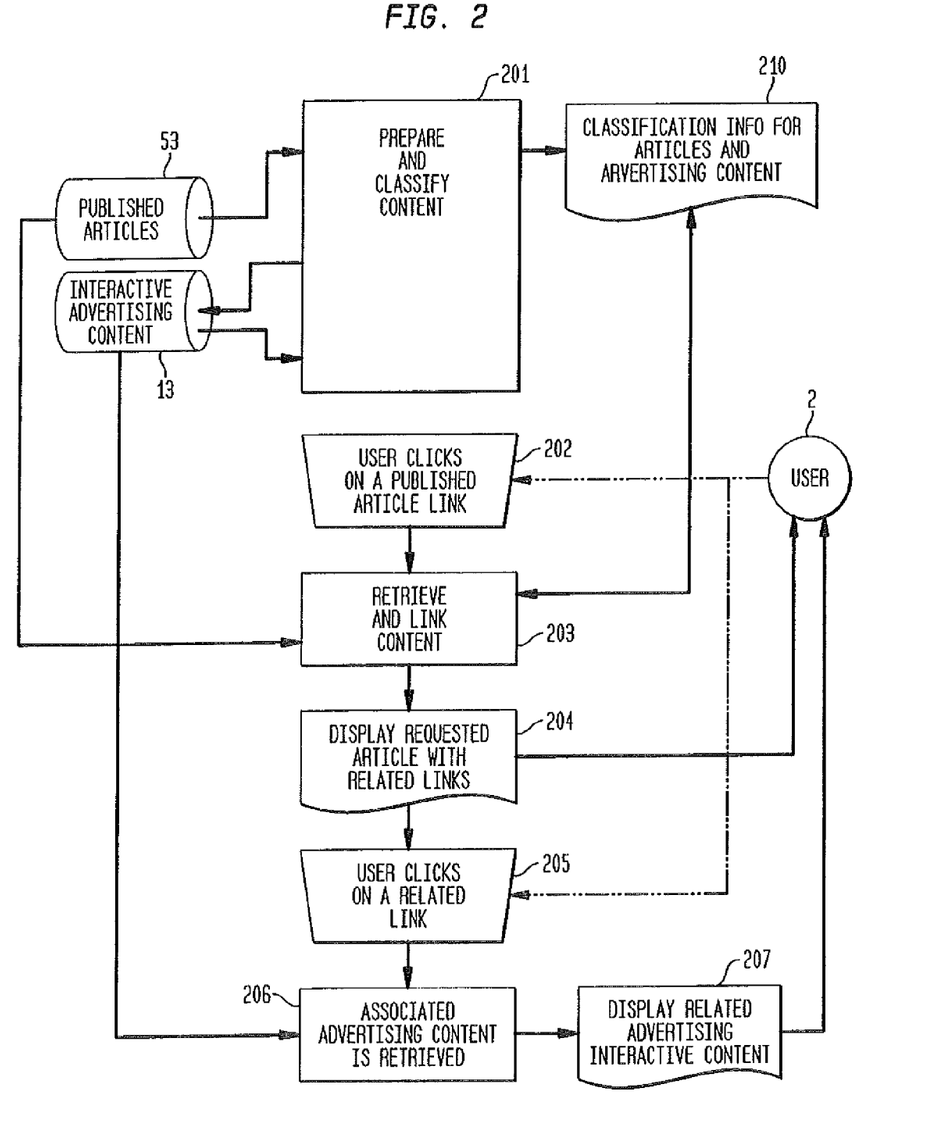
FIG. 2 is a chart of a process for preparing, classifying, retrieving and displaying editorial content and related advertising content, according to an embodiment of the invention.

Steps in a process for classifying, retrieving and presenting editorial and advertising content to a user, in accordance with an embodiment of the invention, are shown schematically in FIG. 2. In step 201 the advertiser microsites are created, and editorial and advertising content is classified. Classification of content through the assigning of categories requires the construction of a taxonomy map (also called a category tree although the taxonomy map is typically a consolidation of many category branches that may or may not intertwine and interconnect) for the editorial content 53.

In an embodiment of the invention, one or more metadata tags (each a relatively small piece of data describing the subject matter of each piece of editorial content) are created for each piece of content by the ERA system (either manually or automatically). The one or more metadata tags are stored, along with the unique identifier associated with the editorial content, on the ERA System. Preferably, the editorial content is not stored on the ERA system.

Similarly, the advertising content 13 is also tagged by the ERA system (either manually or automatically). The tagging metadata (classification information) is created using the master taxonomy map 210. The taxonomy map is a tree of hierarchically arranged categories that reflect concepts that are organized from broad categories to narrow aspects of those categories. The greater the correspondence between the taxonomy map-based classification of the editorial content and the taxonomy map-based classification of the advertiser content, the greater the relevance of the advertiser content to the editorial content.

The taxonomy map itself is generated either manually or automatically. If manually, the taxonomy map is created from a review of the publications on the publisher site. Extrinsic resources (e.g. an expert in the field, other publications, other websites, etc.) are contemplated as useful in developing the taxonomy map. The categories are organized in a hierarchical manner with the broader, dominant categories being nearer the top of the hierarchy and the narrower, more focused categories being further down the hierarchy. Individual hierarchies are referred to as "branches" and the consolidated hierarchies are referred to as a 'tree' (or taxonomy map) herein. A branch is created by reviewing the editorial content for concepts and assigning at least one category and, more typically, a set of hierarchically arranged categories to those concepts. If the tree is generated automatically, an algorithm is created that searches the content for words or word patterns that are linked to concepts and then creates a tree of categories based upon the identified concepts. The categories used are largely a matter of design choice, configured to provide sufficient information about the editorial content and the advertiser content to link the two together in the appropriate circumstances. Typically, the trees are then assembled into the taxonomy map.

Once the taxonomy map is generated, it is used to classify the system content (i.e. the editorial content and the advertiser content). Upon review of a piece of content, the content is given a classification having one, but preferably more than one, hierarchically arranged categories from the tree. Again, the classification can be done automatically or manually. If manually, the content is simply reviewed and assigned a classification based upon the taxonomy map. If automatically, then an algorithm is used that identifies words or word patterns in the content and assigns taxonomy map-based classifications based upon the identified words or word patterns.

In one embodiment, the ERA environment 10 is configured to retrieve or fetch the editorial content from the publisher environment rather than relying on the publisher environment to forward the editorial content to the ERA environment for tagging. For example, a search algorithm is employed in either a manual or automated feed to identify editorial content in the publisher environment 5 for tagging. One skilled in the art is aware of many different algorithms that might be employed for this purpose. In one embodiment, the algorithm is instructed to search the URL of the content on the publisher website for indicia that the URL is a link to editorial content. This can be achieved by configuring the algorithm to identify patterns in the URL such as an 'ArticleID' parameter in the query string or a path including 'ViewArticle.' When the algorithm identifies a URL with the pattern, the algorithm extracts a link to the URL. In another embodiment a crawler is used to look at pages of content and extract links to those pages that have content that the crawler is programmed to identify as editorial. The web crawler or algorithm can be employed either for initial tagging or to identify new and untagged items of editorial content that are then tagged.

Once a classification is determined for the item of editorial content, the item is tagged. The tag represents the classification. The classification is, in turn, the categories hierarchically arranged in the manner dictated by the taxonomy map. Typically each microsite and each publication has a classification that includes one or more categories arranged in the manner dictated by the taxonomy map. The classification is stored as metadata. The microsite metadata is illustrated as 16 in FIG. 1C. The threshold degree of linkage required to load a microsite link adjacent to a particular item of editorial content is also largely a matter or design choice. For example, a selected taxonomy map might classify an article about endangered African tigers according to the category tree Africa→Animals→endangered species→tigers. When the editorial content is loaded, links to microsites might be loaded if there is a single match between the classification of the editorial content and the classification of the microsite. To ensure relevance, multiple matches between categories might be required, or matches in category hierarchy as determined by the taxonomy map might be required. Exemplary algorithms for matching the classification of editorial content with the classification of advertiser content are described in detail below.

When a user 2, visiting the publisher's website 1, clicks on a link to an item of editorial content (step 202), the unique identifier for the editorial content is communicated to the ERA environment. Using the unique identifier as a reference, tagging metadata for that item of editorial content is retrieved and a set of related advertising links to microsites resident in the ERA environment are prepared (step 203). The requested article and the related links are displayed to the user (step 204). The links are displayed in a frame that is actually part of the ERA environment yet appears adjacent the editorial content displayed in the publisher environment. In a preferred embodiment, the fact that this frame is not part of the publisher environment (i.e. not delivered by the servers that deliver the publisher content) is not visually apparent to the user. When the user clicks on an advertising link (step 205), the advertising content associated with that link is retrieved (step 206). This advertising content is then displayed to the user (step 207), generally in a new web browser window. However, the user has not exited the publisher environment. Typically, the window for the publisher is "behind" the window for the microsite. When the user closes the microsite window, the user will return to the publisher window.

Figure 3A:
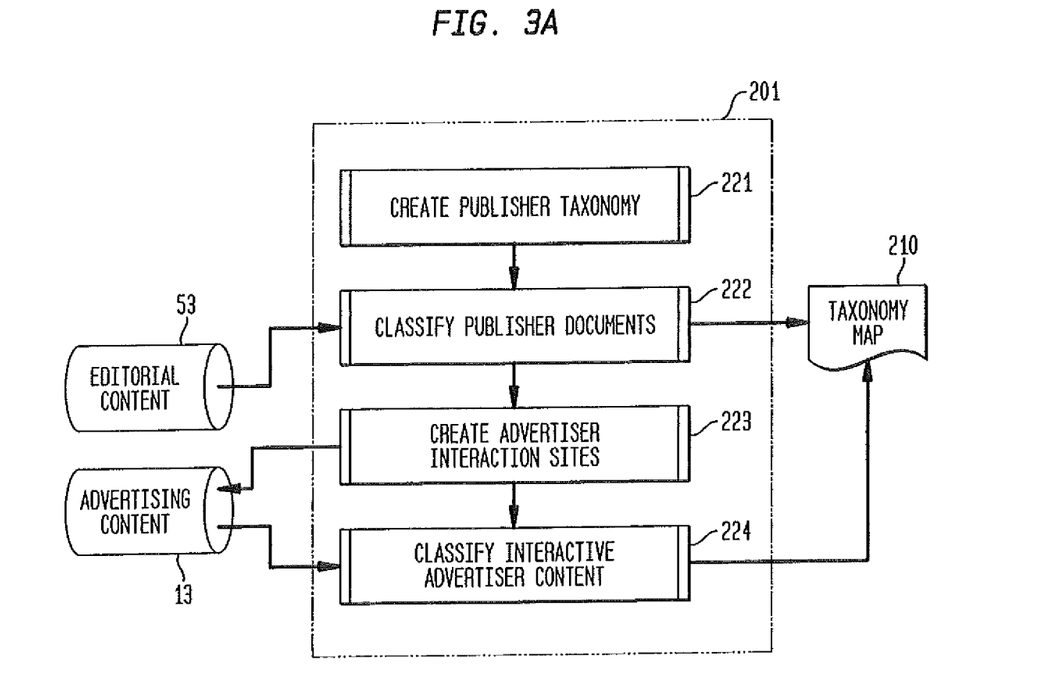
FIG. 3A is a chart showing details of the process for preparing and classifying content of FIG. 2.

Details of the offline (referred to herein as "ERA backend") process 201 are shown in FIG. 3A. In step 221, the taxonomy map (category tree or assembly of category trees) is created for the editorial content from the hierarchically arranged categories that are configured to reflect concepts for classification. The various items of publisher editorial content are then classified in accordance with this taxonomy map (step 222), by assigning one or more hierarchically arranged categories in the tree to each item. The assigned category(s) according to the taxonomy map is the classification for the item. The classification is stored as metadata along with the identifier for the editorial content. Each assigned classification may be viewed as a single path through the taxonomy map.

The advertiser microsites are similarly classified. Specifically, at least one microsite is created for each subscribing advertiser (step 223). Each advertiser then provides advertising content, which is also classified in the same manner that the editorial content is classified (step 224). Each microsite page is assigned one or more metadata tags that reflect the item's classification based upon the taxonomy map 210. It is contemplated that each new item of content (either publisher's editorial content or advertising content) will be classified as it is added to the website. In some embodiments, the addition of new items will require the taxonomy map to be updated. In these embodiments, an updated taxonomy map might require an update of the classifications for all items of editorial and advertising content. In other embodiments, typically when only minor changes to the taxonomy map are made, updating the classifications for all items of editorial and advertising content is not required.

In this embodiment, the ERA system provider constructs the taxonomy map and has responsibility for classifying each item of content and generating the corresponding metadata. It should be noted that the quality of the user's experience is largely determined by the quality of the links between the items of editorial content and advertising content, which in turn depends on the accuracy of the classification and tagging procedure. In a preferred embodiment, the ERA system (either manually or automatically) performs these tasks.

Figure 3B:
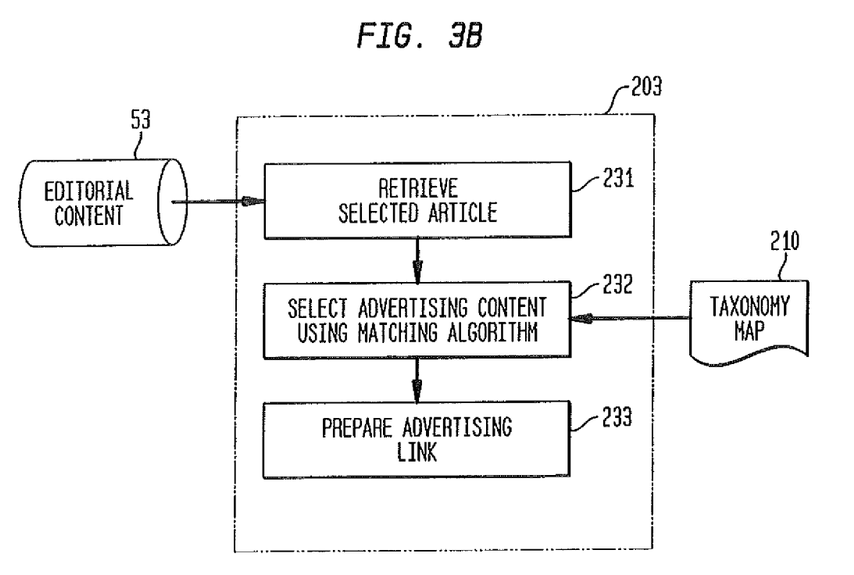
FIG. 3B is a chart showing details of the process for retrieving and linking content of FIG. 2.

Some details of the content retrieval and linking process 203 are shown in FIG. 3B. In step 231, the editorial content selected by the user is loaded onto the publisher site. The identifier for this editorial content is communicated into the ERA environment and serves as an input for a content matching algorithm deployed in the ERA environment. The advertising content relevant to this editorial content is selected, using the classification information and the matching algorithm (step 232). Links are then prepared (step 233) for the items of advertising content identified as relevant to the editorial content by the matching algorithm, or alternatively for a selected number of the most relevant items. The number of configuration settings that can be used to control the number, ordering and presentation of the links as well as the behavior of the matching algorithm is a matter of design choice and is not described in detail herein.

Figure 4:
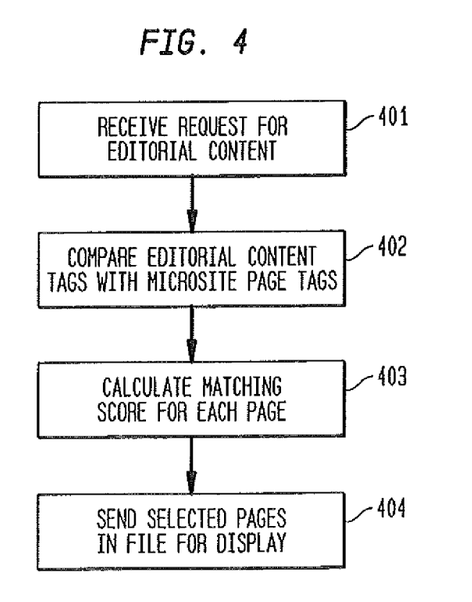
FIG. 4 is a flowchart schematically illustrating a content matching algorithm in accordance with an embodiment of the invention.

The algorithm for generating the related advertising links is shown schematically in FIG. 4. When a user requests a particular item of editorial content, e.g. by clicking on an entry listed on the publisher's website (step 401), an identifier for that item of content is communicated to the ERA environment. The metadata tags assigned to that content are retrieved, and compared with metadata tags of advertisers' microsite pages (step 402). In one embodiment, a microsite page is deemed to match the requested editorial content if the tags are identical, or if the advertiser microsite page has a tag that is more specific than the tag of the requested item. A matching score for each page is then calculated (step 403). Each of the tag matches for a page is assigned a numerical value, and these values are added to obtain a total score for the microsite page. For example, an exact tag match might be assigned a value of 1.0 while a microsite page tag more specific by one level (that is, one level deeper on the category tree than the tag of the editorial content) might be assigned a value of 0.9, and two levels a score of 0.8. (In this example the predetermined "base value" of an exact tag match is 1.0 and the "step value", the deduction for each new level one must search before a match is found, is 0.1; the base and step values may be configured by the system administrator. The administrator may assign a negative score to categories that do not match.) Links to the highest scoring microsite pages are then sent to a window (e.g. in an XML feed or an HTML feed that is customized per publisher) for display to the user alongside the requested editorial content (step 404). In addition to simply forwarding links to those microsites with the highest matching score, a predetermined matching score threshold can be set in the system. If a maximum number of microsite matches per item of editorial content is exceeded, then only the links to the highest-scoring microsites in the ERA environment will be sent. Various other constraints may be placed on the number of microsite page links that are sent. For example, a minimum score or threshold score may be specified, so that only pages at or above that score are sent.

To discuss a more detailed example, suppose that the user is interested in a published article about dogs. The selected editorial content item is tagged "Animals→Mammals→Dogs." Those tags, along with the unique identified for the article are already stored in the ERA environment. A microsite page in the ERA environment is tagged "Animals→Mammals→Dogs" and is selected as a matching tag. A microsite page in the ERA environment having a tag "Animals→Mammals→Dogs→Dobermans" will also be a match, since the tag is more specific (one level down the category tree) than the tag of the editorial content. The tag "Animals→Mammals→Dogs→Fighting Dogs→Pit Bulls" is also a matching tag, being two levels down the category tree. However, a microsite with the tag "Animals→Mammals" would not be a matching tag. If, as in the above example, the base value for a match is 1.0 and the step value is 0.1, the page tagged "Animals→Mammals→Dogs" has a score of 1.0, "Animals→Mammals→Dogs→Dobermans" has a score of 0.9, "Animals→Mammals→Dogs→Fighting Dogs→Pit Bulls" has a score of 0.8 and "Animals→Mammals" has a score of 0. This is referred to as weighted matching. Weighted matching provides greater precision to linking editorial content to advertising content by allowing an adjustable threshold for the links. For example, if a match is any score above zero, then the threshold might be set at 0.6 or 0.7 to ensure that only links to the "most relevant" advertising content are displayed. It is contemplated that the threshold can be adjustable depending upon the number of links identified as matching. Specifically, if the system identifies 20 matches, then a higher threshold value for the displayed links is used, whereas when the system identifies 4 matches, a lower threshold matching score is used.

Further in this regard, the system can employ a filter that simply controls the number of links displayed and then displays those with the highest matching scores. For example, the filter can be set at five links. When matching scores are computed, only the links for the five items of advertising content with the highest matching scores will be loaded in the window adjacent the editorial content on the publisher site.

In another embodiment, a geographic filter is applied to the links. In this embodiment, the user's IP address is used to compare the user's geographic origin to metadata for the advertising content that indicates a specific geographic applicability. For example, metadata for the advertising content indicates that the advertising content is appropriate for a particular region (e.g. US, UK, all, etc.). For example the restrictions on pharmaceutical advertising vary by country. As such, a microsite with pharmaceutical advertising might need to comply with certain laws in the US, which might render it non-compliant with laws in the UK. To avoid potential problems, individual microsites for advertising pharmaceuticals are created for the US and UK, each compliant with the laws for their applicable country. In an alternate embodiment, a single microsite is created having individual pages (e.g. one for the US and one for the UK). Each page is compliant with the laws/regulations of the region for which it is configured. When accessing the microsite the link provides the geographic IP address of the user. When executing the matching algorithm, the IP address is also matched to ensure that the metadata indicating geographic applicability for the microsite/microsite page (as applicable) matches the geographic information in the user's IP address.

Publisher's editorial content or advertisers' microsite pages may have more than one tag. Furthermore, since some categories are more important than others in defining the nature of an item of content, categories may be classed as either "primary" or "modifier" categories. A tag matching a modifier category may be assigned a lower base value (e.g. 0.5). As a further example, the requested content might be tagged "Animals→Mammals→Dogs" and "Toys→Balls" with "Toys" the modifier category. A microsite with two tags, "Animals→Mammals→Dogs→Dobermans" and "Animals→Mammals→Dogs→German Shepherds", would then have a matching score of 1.8, since its two tags are one level more specific than the primary category and each scores 0.9. Another microsite with the tags "Animals→Mammals→Dogs" and "Toys→Balls→Bouncy" would have a matching score of 1.4, since it would match the primary category exactly (scoring 1.0) and be one level more specific than the modifier category (scoring 0.5−0.1=0.4).

It will be appreciated from these examples that the ERA system matches advertising content with editorial content and is therefore content-based, as opposed to keyword-based. To illustrate this difference, consider a user interested in the health benefits of olive oil. A keyword-based contextual advertising service might serve the user an advertisement from a petroleum company highlighting offshore drilling for crude oil, based on the match with the keyword "oil." Not only is the advertising content not relevant, but its presence alongside the article accessed by the user has a negative effect on the user's experience and adds no value to either the publisher or the advertiser.

It is noteworthy that the advertising content matching algorithm is not required to reexecute simultaneously with each retrieval of the editorial content. The system can be set to store the results of the matching algorithm for some period of time (e.g. 15 minutes). If an item of editorial content is retrieved by a second user within the specified time window, the stored result of the matching algorithm and the links are deployed based upon this value. This strategy saves computation resources in the system and speeds the retrieval process. The links to the matching microsite pages are advantageously displayed next to the editorial content in an unobtrusive fashion, so that the overall presentation adds value to the publisher's website. Since the displayed links to the advertisers' microsites are relevant to the user's interest, the publisher's website acquires greater value as a research tool for the user.

Figure 5A:
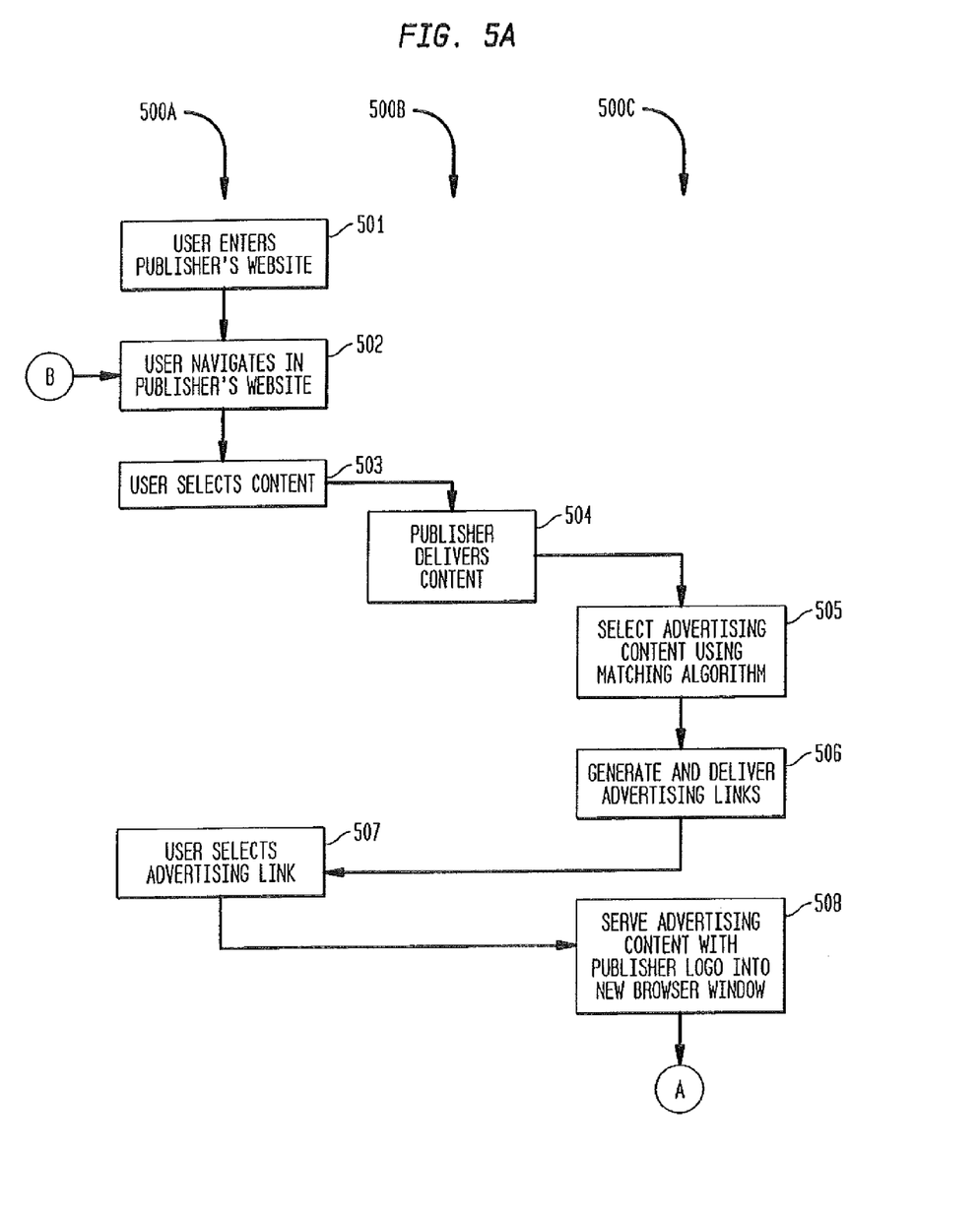
FIGS. 5A and 5B are connected flowcharts showing the interaction between a user, the website publisher, and an ERA system according to an embodiment of the invention.
Figure 5B:
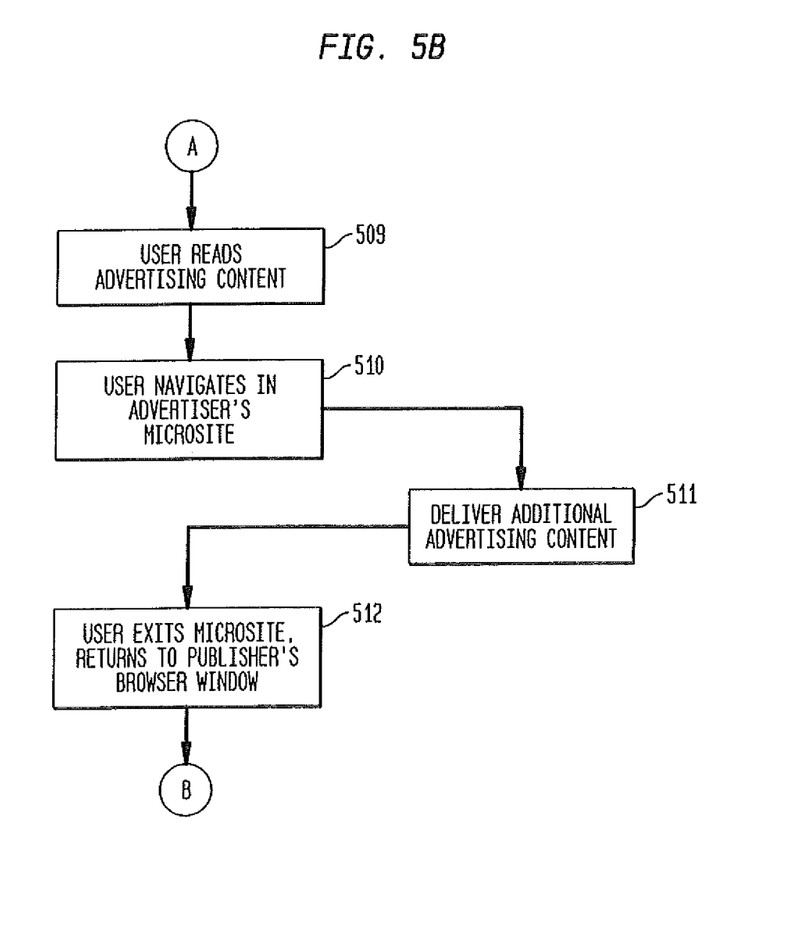

The interaction between the user, the publisher and the ERA system is diagrammed in FIGS. 5A and 5B (which are to be read as connected flowcharts). In these figures, steps performed by the user, publisher and ERA system are arranged in columns 500A, 500B, 500C respectively. A user enters a publisher's website (step 501) and navigates in that website, searching for interesting content (step 502). The user selects an item of content, e.g. by clicking on a displayed title of an article (step 503); the publisher delivers that content (step 504) and the unique identifier for the article is sent to the ERA environment. The ERA system uses the matching algorithm, along with the metadata for the editorial content, to identify microsite pages relevant to the user's selection (step 505), and then generates links to those pages to be displayed to the user (step 506) through an XML or HTML feed to the publisher's website. When the user selects one of these links to view advertising content (step 507), the ERA system serves that advertising content into a new browser window (step 508). This advertising content can be displayed in a window that is branded with the publisher's logo and other branding elements (e.g. colors, bylines, and imagery associated with the publisher) appropriate to the publication into which the ERA system has been integrated. Alternatively, the advertiser and publisher may elect for the window in which the advertising content is displayed to have a completely different look and feel than the publisher's environment. After viewing the advertising content (step 509), the user may remain in the advertiser's microsite and navigate to other offerings therein (step 510), selecting additional links and viewing additional microsite pages. The ERA system presents the additional advertising content to the user within the same browser, based on the selections made by the user in the microsite (step 511). In addition, the user may choose to view other advertiser microsites or search advertiser content within the ERA system. When finished viewing the advertising content (step 512), the user closes the window and thereby returns to the publisher's browser window. The user may then continue to navigate in the publisher's website (returning to step 502). It should be noted that, since the advertising content may be displayed along with the publisher's publication branding and logos, the user may not perceive that they have left the publisher environment when investigating advertising content. As previously noted, the publisher environment is minimized or "behind" the microsite, making it easy for the user to return to the publisher environment by simply closing the window displaying the advertising content.

Figure 6A:
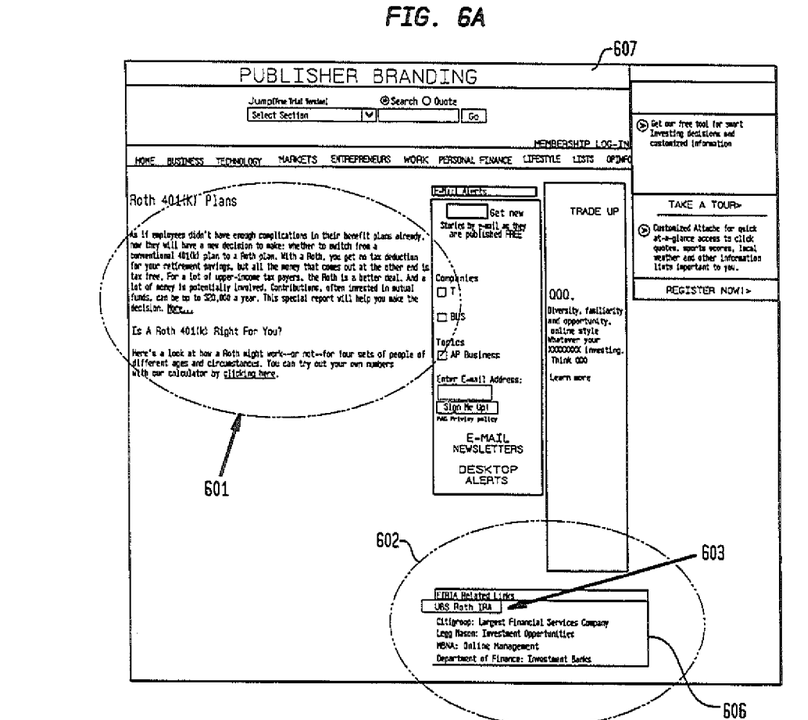

FIGS. 6A and 6B show displays to the user (screenshots) in accordance with an embodiment of the invention. In FIG. 6A, the selected editorial content 601 discusses retirement planning. The ERA related links 602 are grouped together alongside this display in a frame 604. As illustrated, there are five links 602 to different advertisers' microsites disposed in frame 606. The frame 606 is actually part of the ERA environment, even though it appears in the publisher environment from the user perspective. If the user clicks on link 603 (UBS: Roth IRA), a new window opens (FIG. 6B) with the publisher's logo and publication branding at the top 607 of the display, and the relevant advertising content beneath. The advertiser may advantageously offer links 604 to other locations in its microsite. It will be appreciated that the publisher's offering is enhanced by the presence of related advertising content. The advertiser benefits by effectively targeting content to its intended audience. Furthermore, the relationship between the publisher and the advertiser is strengthened through the successful interaction between their respective content offerings.

Another advantage of the system described herein is that traffic can be driven to the microsites without being required to go through the publisher's website. For example, it is contemplated that the ERA environment is accessible via the internet. Internet users will typically access the microsites via search engines (e.g. Google). It is advantageous if the microsites are configured for search engine optimization to increase the probability that users in addition to those users from the publisher website will link through to the microsite. One skilled in the art is well versed in the techniques of search engine optimization. Such optimization includes optimizing the keywords in the opening paragraph of the microsite page, (e.g. avoiding the use of abbreviations, lesser-known jargon, etc.). This concept is illustrated in FIG. 1C, which shows a web connection 30 to the ERA environment 10. The system described herein is advantageous because it can be configured to allow users of the web via search engine in addition to users on the publisher website to access the advertiser microsites. The system is also advantageous because it can be configured to increase the likelihood that users will access the microsite via the search engine.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

The invention claimed is:

1. A method for linking secondary content to related primary content in a web-based system, comprising the steps of:
constructing a taxonomy map for primary information content and secondary information content;
assigning at least one tag to each item of primary information content in accordance with the taxonomy map;
assigning at least one tag to each item of secondary information content in accordance with the taxonomy map;
performing a comparison of tags corresponding to a selected item of primary information content and tags corresponding to secondary information content;
evaluating the comparison against a predetermined threshold; and
providing a link to an item of secondary information content adjacent the selected item of primary information if the comparison meets or exceeds the predetermined threshold.

2. A method according to claim 1, further comprising the step of displaying the selected item of primary information content in accordance with input from a user.

3. A method according to claim 2, wherein said step of displaying of the selected item is performed simultaneously with said comparison.

4. A method according to claim 1, further comprising the step of displaying the selected item of secondary information content in accordance with input from a user.

5. A method according to claim 4, further comprising displaying a plurality of links adjacent the selected item of primary information wherein the plurality of links are displayed subject to a specified maximum number of links.

6. A method according to claim 1, wherein the predetermined threshold is a match between the respective tags of the items of primary information content and the items of secondary information content.

7. A method according to claim 6, wherein the tags reflect the hierarchically arranged categories.

8. A method according to claim 1, wherein the taxonomy map is formed from a hierarchical arrangement of predetermined categories of content.

9. The method of claim 8 further comprising updating the taxonomy map by adding or deleting categories.

10. The method of claim 8 further comprising updating the taxonomy map by changing the category hierarchy.

11. A method according to claim 1, wherein the tags are assigned without regard to keywords in the primary information content or the secondary information content.

12. A method according to claim 1, wherein the result of said comparison is a matching score of the item of secondary information content, and said step of displaying a link to an item of secondary information content further comprises displaying a link to a plurality of items of secondary information content for which the matching score meets or exceeds the predetermined threshold.

13. A method according to claim 1, wherein the result of said comparison is a matching score for the item of secondary information content, and said predetermined threshold is a matching score that corresponds to relative positions on the taxonomy map for the item of primary information content and the item of secondary information content.

14. The method of claim 13 wherein the matching score is determined by an algorithm that evaluates the tag for the primary information content against one or more tags for the secondary information content and determines the matching score by deducting a predetermined value for incomplete tag matches or missing tags.

15. A method according to claim 1, further comprising the step of assigning at least one tag to each new item of primary information content or a new item of secondary information content as it is added to the web-based system.

16. The method of claim 1 further comprising assigning metadata to an item of secondary content that is an indication of geographic applicability.

17. The method of claim 16 further comprising comparing a user IP address to the metadata indicating geographic applicability.

18. The method of claim 17 wherein the step of providing further includes providing only links to secondary content having metadata indicating geographic applicability that matches the user IP address.

\* \* \* \* \*